3,123,486
ALKALI METAL METALATES
Carl E. Johnson, Glen Ellyn, Ill., assignor to Nalco Chemical Company, Chicago, Ill., a corporation of Delaware
No Drawing. Filed Sept. 6, 1960, Ser. No. 53,875
20 Claims. (Cl. 106—162)

The present invention relates to alkali metal metalate compounds having the general formula $A_{2x-y}MO_x$ where A represents an alkali metal, M is one of the metals, iron, chromium or titanium, $x$ is a number from 1 to 4 and $y$ is the valence of the metal "M." The invention also relates to a method of making alkali metal metalate compositions which are soluble in water and which can be dried into solid masses which are also water soluble and/or dispersible. The term "metalate" is here used to define anionic radicals which contain a metal associated with oxygen.

The alkali metal metalates of the metals, titanium, chromium, and iron have been reported in the literature. Although these compounds have been known, they have not been exploited commercially to any great extent. When prepared in accordance with the prior art they are usually insoluble in water as well as being subject to hydrolysis in the presence of aqueous media. Another disadvantage of most of the alkali metal metalates of iron, titanium, and chromium is that elevated temperatures are usually required for their production. Thus, in the case of titanates it has been reported that alkali metal titanates may be prepared by heating either the alkali metal oxide, hydroxide or carbonate with hydrated titanium dioxide to about 1700° C. The finished products are insoluble in water and are decomposed in strong mineral acids, such as hydrochloric or sulfuric.

In U.S. Patent 2,111,460 it is suggested that alkali metal titanates, particularly potassium titanate, may be prepared by heating solid potassium hydroxide and dry titanic acid to a temperature of between 150° and 220° C. The reaction, when completed, produces a potassium or alkali metal titanate which is said to be soluble in cold hydrochloric acid and also contains a small amount of insoluble residue, presumably $TiO_2$. The titanates produced in accordance with this patent are not water soluble.

Similarly the chromites and the ferrites may be prepared by reacting the appropriate oxides with relatively concentrated caustic solutions, or by fusing the oxides with caustic. In each instance, the materials produced are not particularly soluble in water and tend to precipitate out as the oxide.

If it were possible to produce alkali metal metalates of iron, titanium and chromium which were soluble in water to a relatively large extent, and which did not tend to precipitate under conditions of storage, valuable products would be produced.

If improved stable solutions of these metalates could be produced, valuable agents would be afforded for the processing of textiles, cellulose fibers and the like. A particularly valuable agent would be stable, aqueous solutions of alkali metal titanates which could be used in the manufacture of paper to act both as a combination sizing, and pH controlling agent, thus replacing both sodium aluminate and titanium pigments which are now used separately to achieve these different effects in various types of paper manufacturing processes. Similarly these materials could advantageously be co-precipiated with certain saturated fatty acids to produce textile treating agents which would render various types of cellulose fabrics water repellent.

It therefore becomes an object of the invention to produce new and improved alkali metal metalates of the formula $A_{2x-y}MO_x$ which have not, heretofore, been known and which are extremely soluble in water and whose solutions are stable under conditions of long-term storage. A, M, $x$ and $y$ have the significance previously mentioned.

Another object is to furnish a simplified method for making alkali metal metalates either as stable solutions or as solid products which may be redispersed into various types of aqueous media to produce stable solutions of these metalates.

In accordance with the invention, it has been found that alkali metal metalates having the general formula $A_{2x-y}MO_x$ which are water soluble and may be dried and redispersed in water to form relatively concentrated yet stable solutions, may be prepared in accordance with the following general procedures.

An aqueous solution is prepared, which contains at least 40% by weight of an alkali metal hydroxide. To this solution there are added certain sugar compounds which will be hereinafter more fully described, in an amount sufficient to provide at least 10% by weight based on the weight of the finished metalate to be produced. After preparing this solution of alkali metal hydroxide and sugar compound, there is added to it, a hydrated metal oxide of either chromium, tianium, or iron. The reactants are heated to at least 100° C. for a period of time sufficient to completely solubilize all the hydradated metal oxide. The solubilization is evidenced by formation of a relatively clear solution.

While I have generically referred to my compositions as having the formula $A_{2x-y}MO_x$ it will be understood that the exact nature of the metalates formed in accordance with the processes described, is not known. Thus, for instance, it is known that the various alkali metal titanates may exist as either the meta titanate $A_2TiO_3$, or as the ortho titanate $A_4TiO_4$ with other hydrated forms of these titanates having been reported. Similarly, in the case of the ferrites, various forms or hydrated types of these materials, e.g., having the anions $FeO_2^-$, $Fe_2O_4^=$ have been described in the literature. The ferrate $Fe_2O_4^=$ is most probably the material produced in accordance with the invention. Various practical problems exist which complicate a precisely exact characterization of the metalates produced in accordance with the invention.

It therefore will be understood that while the compounds of the invention have been described in terms of particular structural formulas, there is a possibility that both the meta, ortho and other forms may be coexistent in either the dried or liquid products. In any event, it will be understood that by carefully following the prescribed procedures, stable solutions and dried alkali metal metalate compounds may be produced which have many novel and useful applications in various fields of industry.

To prepare the metalates it is necessary that the so-called "hydroxides" be prepared from either the oxide or salts of titanium, iron, or chromium. It is well known that the so-called hydroxides of these metals, particularly those of titanium and chromium, do not exist as such, but are in the form of hydrated oxide. Hydrated oxides in the case of titanium, may be generally represented by formula $TiO_2 xH_2O$. This is similarly true with chromium oxide, $Cr_2O_3 xH_2O$. The hydrated titanium oxides are conveniently prepared by treating titanium tetrachloride with water. The pH of the solution is raised to about 8.0 with aqueous ammonia. The solution is then heated at 90°–100° C. for at least 30 minutes. The hydrated oxide is then filtered and washed with hot distilled water.

The alkali metal hydroxide solutions used in preparing the alkali metal metalates should contain at least 40% by weight of alkali metal hydroxide. They may contain as much as 75% by weight of alkali metal hydroxide, although most satisfactory results are obtained when the concentration of alkali metal hydroxide in the starting solution is between 50 and 55% by weight.

While any alkali metal hydroxide may be used, the most advantageous from both the standpoint of economics as well as performance, is either potassium hydroxide or sodium hydroxide. Lithium, cesium, and rubidium hydroxide may also be used wtihout departing from the spirit of the invention.

Perhaps the most important feature of the invention resides in treating the caustic solution, prior to the addition of the hydrated metal oxide with a sufficient quantity of certain sugar compounds. The quantity of sugar compound used should be at least 1% by weight, based upon the weight of the finished metalate produced, and is most preferably between 2 and 30% by weight thereof, with most finished metalates produced in accordance with the invention showing improved stability and water solubility when the amount of sugar compound is present in the starting caustic solution at a concentration range of between 8% and 20% by weight.

While numerous sugar compounds may be employed to act as stabilizers or catalysts for the metalates of the invention, the most preferred are the hydrogenated aldohexoses, which are polyhydroxyl compounds exemplified by the commercially available materials, sorbitol and mannitol. In addition to using sorbitol and mannitol, other hydrogenated aldohexoses, such as hydrogenated galactose, hydrogenated allose, hydrogenated altrose, hydrogenated talose, hydrogenated gulose, and hydrogenated idose may also be employed with equal effectiveness. The best results are achieved by using the sorbitol which is both inexpensive and commercially available.

In addition to using the hydrogenated aldohexoses, other sugar type compounds such as the well known aldohexoses, e.g., glucose, mannose, galactose, allose, altrose, talose, gulose, idose, including both their d and l isomers have proven satisfactory. In addition to using the aldohexoses, other hexoses such as ketohexoses, as well as the various carboxylic acids prepared from these materials are also beneficially employed. Thus, gluconic acid, may be used. In addition to using the acids per se, their alkali metal salts such as sodium gluconate may be used.

In order to achieve products which have a high degree of stability, it is important that there be a slight excess of alkali metal hydroxide in relation to the starting metal oxide. Thus, the alkali metal oxide ($A_2O$) to metal oxide ($MO_{y/2}$) molar ratio should be at least 1.1:1. In this formula also, A represents an alkali metal, M represents iron, titanium or chromium, and $y$ represents the valence of "M." It is preferable that the molar ratio be slightly in excess of that specified with good results being obtained within the general range of between 1.15:1 to 2:1 with the most satisfactory products being those having a molar ratio within the range of from 1.25:1 to 1.5:1.

As indicated, to produce the compositions of the invention, it is necessary that the caustic-sugar compound solution be raised to an elevated temperature in order to adequately react with the hydrated metal oxide which is added thereto. In a preferred form, the solution is heated prior to the addition of the hydrated metal oxide, and the temperature of the caustic-sugar compound solution should be at least 100° C. with a preferred temperature range being between 100–150° C. with temperatures ranging between 120–150° C. being most advantageous.

After the addition of the hydrated metal oxide to the caustic-sugar composition solution, the temperature ranges should be maintained for between 15 minutes to 2 hours. Usually heating for ½ to 1 hour will produce satisfactory products. During the reaction period, it is beneficial if mild agitation is employed. This tends to somewhat expedite time necessary to complete the reaction. The completion of the reaction, as indicated, is evidenced by a clear solution being produced. However, if the time periods mentioned are adhered to, the desired compositions will be produced. The time temperature relationships are, of course, dependent upon the $A_2O:MO_{y/2}$ ratio. They are also effected by the particular hydrated metal oxide added to the caustic-sugar compound solution, as well as to the type and quantity of sugar compound present. It has been observed that if the sugar compound is not added to the caustic solution prior to the addition of the hydrated metal oxide, the reaction does not seem to go and little if any of the hydrated metal oxide will go into solution.

The compositions of the invention are relatively concentrated and they may be diluted with water for use in commercial applications. One of the surprising features of the invention is that the compositions may be dried to pasty masses which in all cases are readily dispersible and/or soluble in water. Usually solutions containing as much as 40% by weight may be prepared from these dried products. The temperatures used to prepare the dried materials should not exceed the temperatures used in preparing the compounds.

To illustrate the preparation of several of the products of the invention, the following are given by way of example.

Example I

To a 50% by weight potassium hydroxide solution, made up with 5 grams of distilled water and 5 grams of potassium hydroxide, there is added ¼ gram of sorbitol. After the solution was prepared, three grams of hydrous titanium hydroxide were slowly added with mild agitation. The reaction mixture was then heated to about 125° C. for 1 hour. At the end of this time a clear solution resulted which was dilutable with water. A sample of the material was withdrawn and dried on a laboratory steam cone to a pasty solid, which was completely redispersible in water.

Example II

To 5 ml. of water there was added 2 grams of potassium hydroxide and ½ gram of sorbital with stirring used. To the sorbitol potassium hydroxide solution was added 2 grams of freshly precipitated chromium hydroxide $Cr(OH)_3$. The mixture was warmed on a steam cone for for about 20 minutes. At this time the solution became homogeneous and was fairly clear. It was then dried to a dark green solid which was readily redispersible in water. A portion of the dried material was dispersed to make up a 20% by weight solution, and was stored at room temperature for 3 months. At the end of that time there was no evidence of precipitation.

The dried products of the invention provide new water soluble alkali metal metalates, which contain a major portion of an alkali metal metalate of the general formula $A_{2x-y}MO_x$, with A, M, $x$ and $y$ having been previously described. The compositions also contain at least .001% by weight of the sugar compound. They may be further described in that they have an excess of alkali metal oxide, $A_2O$, such that the molar ratio $A_2O:MO_{y/2}$ is at least 1:1.

The preferred compositions have $A_2O:MO_{y/2}$ molar ratio within the range of 1.15:1 to 2:1, and desirably 1.25:1.15:1. The amount of sugar compound present should preferably be within the range of 2 to 20% by weight of the finished composition.

The dried compositions of the invention will in most cases be in the form of colloidal, gell-like structures and, therefore, contain a certain amount of entrained water, as well as certain amounts of water of hydration. The finished compositions, therefore, in addition to the above constituents will contain between .5% and about 20% by weight of water, although they will most usually contain about between 2 and 5% by weight of water. Complete dehydration of the products which must be accomplished at temperatures in excess of those used for the compositions renders the products water insoluble.

The compositions of the invention, as described, are extremely novel, in that they are soluble in water and do not tend to precipitate under conditions of long term storage. They find particular utility in the manufacture of paper where they are capable of replacing conventional sizes, such as alum rosin sizes, as well as titanium dioxide pigments. The alkali metal metalates function not only as sizing agents in conjunction with such materials as soap, but they also will tend to brighten and give a higher degree of opacity to any finished papers into which they are incorporated.

The invention is hereby claimed as follows:

1. A method of producing a water soluble alkali metal metalate compound of the general formula $A_{2x-y}MO_x$, which comprises adding a hydrated metal oxide of the formula $MO_{y/2}$ to an aqueous solution containing dissolved therein 40–75% by weight of an alkali metal hydroxide and 1–30% by weight, based on the weight of the alkali metal metalate to be produced, of a sugar compound from the group consisting of hexoses, hydrogenated aldohexoses, and sugar acids and salts thereof, with the molar ratio of alkali metal oxide, $A_2O:MO_{y/2}$ being within the range of from 1.1:1 to 2:1 and heating the reactants to elevated temperature for a time sufficient to produce a clear solution of said metalate, where A in the above formulas represents an alkali metal, M is a member of the class consisting of chromium, iron and titanium, $x$ is an integer of from 1 to 4 and $y$ is the valence of the metal M.

2. The process of claim 1 where the reactants are heated to about 100° to 150° C.

3. The process of claim 2 where M is titanium.

4. The process of claim 2 where M is chromium.

5. The process of claim 2 where M is iron.

6. The process of claim 2 where the sugar compound is sorbitol.

7. A method of producing a water soluble alkali metal metalate compound of the general formula $A_{2x-y}MO_x$ which comprises adding a hydrated metal oxide of the formula $MO_{y/2}$ to an aqueous solution which contains dissolved therein from 40 to 75% by weight of an alkali metal hydroxide, and from 2 to 30% by weight based on the weight of the alkali metal metalate to be produced, of a sugar compound from the group consisting of hexoses, hydrogenated aldohexoses, and sugar acids and salts thereof, with the molar ratio of alkali metal oxide $A_2O:MO_{y/2}$ being within the range of from 1.15:1 to 2:1, and heating the reactants to between 100° to 150° C. for a period of time sufficient to produce a clear solution of said metalate, where A in the above formulas represents an alkali metal, M is a member of the class consisting of chromium, iron and titanium, $x$ is an integer of from 1 to 4 and $y$ is the valence of the metal M.

8. The method of claim 7 wherein the aqueous solution contains from between 50 and 55% by weight of alkali metal hydroxide, the sugar compound is present at between 8 and 20% by weight and the $A_2O:MO_{y/2}$ ratio is within the range between 1.25:1 and 1.5:1.

9. The method of claim 7 wherein the sugar compound is present within the range of between 8 and 20%.

10. The method of claim 7 where the sugar compound is sorbitol.

11. The method of claim 7 where M is titanium.

12. The method of claim 7 where M is chromium.

13. The method of claim 7 where M is iron.

14. A new water soluble composition of matter consisting essentially of a major portion of an alkali metal metalate of the general formula $A_{2x-y}MO_x$ and at least .001% by weight of a sugar compound from the group consisting of hexoses, hydrogenated aldohexoses, and sugar acids and salts thereof, said composition also containing an excess of alkali metal, expressed as $A_2O$ in an amount such that the $A_2O:MO_{y/2}$ molar ratio is within the range of from 1.1:1 to 2:1 where A in the above formulas represents an alkali metal, M is a member of the class consisting of chromium, iron and titanium, $x$ is an integer of from 1 to 4 and $y$ is the valence of the metal M.

15. The composition of claim 14 where M is titanium.

16. The composition of claim 14 where M is iron.

17. The composition of claim 14 where M is chromium.

18. The composition of claim 14 where the sugar compound is sorbitol.

19. The composition of matter of claim 14 where the sugar compound is present within the range of between 20 and 30% by weight, and the $A_2O:MO_{y/2}$ molar ratio is within the range of 1.15:1 to 2:1.

20. The composition of claim 14 where the sugar compound is present within the range of between 8 and 20% by weight, and the $A_2O:MO_{y/2}$ ratio of 1.25:1 to 1.5:1.

References Cited in the file of this patent

UNITED STATES PATENTS

| | | |
|---|---|---|
| 1,697,929 | Ryan | Jan. 8, 1929 |
| 2,111,460 | Rockstroh | Mar. 15, 1938 |
| 2,841,470 | Berry | July 1, 1958 |